United States Patent
Boger et al.

(10) Patent No.: US 11,753,980 B2
(45) Date of Patent: Sep. 12, 2023

(54) CONTOURED HONEYCOMB BODIES

(71) Applicant: CORNING INCORPORATED, Corning, NY (US)

(72) Inventors: Thorsten Rolf Boger, Bad Camberg (DE); Ameya Vinay Joshi, Exton, PA (US); Konstantin Vladimirovich Khodosevich, Saint Petersburg (RU); Kunal Upendra Sakekar, Pune (IN); Edward Zhmayev, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 107 days.

(21) Appl. No.: 17/598,984

(22) PCT Filed: Mar. 12, 2020

(86) PCT No.: PCT/US2020/022327
§ 371 (c)(1),
(2) Date: Sep. 28, 2021

(87) PCT Pub. No.: WO2020/205195
PCT Pub. Date: Mar. 12, 2020

(65) Prior Publication Data
US 2022/0178292 A1    Jun. 9, 2022

Related U.S. Application Data

(60) Provisional application No. 62/828,653, filed on Apr. 3, 2019.

(51) Int. Cl.
*F01N 3/28* (2006.01)
*F01N 13/00* (2010.01)

(52) U.S. Cl.
CPC ......... *F01N 3/2803* (2013.01); *F01N 3/2828* (2013.01); *F01N 13/008* (2013.01); *F01N 2330/30* (2013.01)

(58) Field of Classification Search
CPC .... F01N 3/2803; F01N 3/2892; F01N 13/008; F01N 2240/20; F01N 2330/30
See application file for complete search history.

(56) References Cited

U.S. PATENT DOCUMENTS 6,938,339 B2   9/2005   Hughes
9,222,393 B2   12/2015  Duda
(Continued)

FOREIGN PATENT DOCUMENTS

CN   201891473 U   7/2011
CN   203835505 U   9/2014
(Continued)

OTHER PUBLICATIONS

Machine translation of FR-2938006-A3, accessed Mar. 9, 2023 (Year: 2023).*

(Continued)

*Primary Examiner* — Jonathan R Matthias
(74) *Attorney, Agent, or Firm* — Joseph M. Homa

(57) ABSTRACT

Engine exhaust gas treatment article comprising a contoured honeycomb body (300) including a contoured outlet end face (316) are disclosed. Also disclosed are methods of manufacturing an engine exhaust gas treatment article.

18 Claims, 14 Drawing Sheets

(56) References Cited

U.S. PATENT DOCUMENTS

| | | | |
|---|---|---|---|
| 2002/0076365 A1* | 6/2002 | Hoelzer | ............. B01D 53/9454 |
| | | | 422/177 |
| 2002/0086614 A1 | 7/2002 | Eichelberger | |
| 2008/0170972 A1 | 7/2008 | Cai et al. | |
| 2010/0050874 A1 | 3/2010 | Lucas et al. | |
| 2014/0178260 A1 | 6/2014 | Duda | |
| 2015/0091203 A1 | 4/2015 | Elliott | |
| 2018/0010507 A1* | 1/2018 | Di Perna | ................ B01D 53/94 |

FOREIGN PATENT DOCUMENTS

| | | | | |
|---|---|---|---|---|
| DE | 102011078295 A1 | 1/2013 | | |
| EP | 0818613 A1 | 1/1998 | | |
| FR | 2218473 A1 | 9/1974 | | |
| FR | 2938006 A3 * | 5/2010 | ............... | F01N 3/28 |
| GB | 1455351 A | 11/1976 | | |
| JP | 52-030516 U | 3/1977 | | |
| JP | 2000-051711 A | 2/2000 | | |
| KR | 10-2009-0097356 A | 9/2009 | | |

OTHER PUBLICATIONS

International Search Report and Written Opinion of the International Searching Authority; PCT/US2020/022327; dated May 25, 2020; 16 pages; European Patent Office.

* cited by examiner

CONTOURED HONEYCOMB BODIES

This is a national stage application under 35 U.S.C. § 371 of International Application No. PCT/US2020/022327, filed on Mar. 12, 2020, which claims the benefit of priority under 35 U.S.C. § 119 of U.S. Provisional Application No. 62/828, 653 filed on Apr. 3, 2019, the content of which is incorporated herein by reference in its entirety.

TECHNICAL FIELD

The present disclosure generally relates to contoured honeycomb bodies, and in particular, contoured honeycomb bodies used in the manufacture of catalytic converters for purifying exhaust gases.

BACKGROUND

Catalytic converters are used to remove pollutants from hot exhaust gases discharged from an internal combustion engine, for example in automobiles including passenger cars, light duty trucks, heavy duty trucks and industrial equipment. A catalytic converter usually includes a substrate in the form of a honeycomb body and may be constructed of a ceramic material, having channels through which exhaust gases flow. The honeycomb body can contain catalyst which functions to purify the hydrocarbons (HC), carbon monoxide (CO) and nitric oxide ($NO_x$) in the exhaust gases.

Existing catalytic converters typically comprise a cylindrical honeycomb body having flat inlet and outlet surfaces. A problem with both surfaces being flat is that gas flow patterns across the radial area of the honeycomb body perpendicular to the longitudinal axis tend to be uneven. As a result, most of the exhaust gases flowing through the honeycomb body are directed to flow through a central portion of the catalytic substrate. Unfortunately, this configuration may result in reduced efficiency of the catalytic function and reduced life expectancy of the catalytic converter.

Thus, existing exhaust gas purifying systems including a cylindrically shaped catalyst coated honeycomb substrate having a flat inlet end face which exhibit non-uniform flow distribution. Specifically, the high velocity exhaust gases which were emitted from a relatively small diameter exhaust pipe of an internal combustion engine did not dissipate when passing from the exhaust pipe into the larger diameter casing in which the catalyst substrate was located. As a result, a large portion of the high velocity exhaust gas tended to flow through the center of the honeycomb body than through the peripheral portion. As a result of this non-uniform flow distribution of exhaust gases through the center, these catalytic converter systems exhibited a loss of conversion efficiency, as well as deactivation of the converter in the region of highest flow velocity. In addition, the non-uniform flow distribution tended to result in a higher pressure drop across the catalyst structure which in turn results in the decreased engine performance.

A variety of attempts have been made to increase the efficiency of the catalytic converter structure. These attempts have included altering the expansion angle between the inlet and the casing. However, the resulting flow still creates non-uniform flow distribution. Other solutions have involved providing honeycomb bodies with conical-shaped or arcuate shaped inlet end faces, which may also include a conical or arcuate-shaped outlet end face.

Therefore, a need exists for catalyst substrates that can enhance uniform gas flow through the substrate and hence the catalytic converter. A need further exists for methods for manufacturing such substrates.

SUMMARY

One aspect of the present disclosure pertains to An engine exhaust gas treatment article comprising a honeycomb body comprising a longitudinal axis, a maximum axial length, a minimum axial length, a plurality of channel walls extending from an inlet end face to an outlet end face defining cell channels therebetween, and a radial area perpendicular to the longitudinal axis, and an outer periphery extending from the inlet end face to the outlet end face, wherein at least one of the inlet end face and the outlet end face of the honeycomb body includes a contour surface that provides a uniform exhaust gas residence time across the radial area of the honeycomb body perpendicular to the longitudinal axis that yields a reduction of at least 20% in a ratio of maximum residence to minimum residence of substrate that has flat surfaces on both ends when exhaust gas is flowed through the honeycomb body.

A second aspect of the present disclosure pertains to method of manufacturing an engine exhaust gas treatment article, the method comprising shaping a honeycomb body comprising a longitudinal axis and a plurality of channels having an inlet end and an outlet end, each channel having a length and a hydraulic diameter and configured to receive a portion of the engine exhaust at an exhaust viscosity and an average exhaust velocity; determining a local channel exhaust gas velocity in the channel for at least a subset of said plurality of channels, the local channel exhaust gas velocity based on the length of the channel, the hydraulic diameter of the channel, the exhaust viscosity and an exhaust gas pressure drop across the length of the channel; determining a proportionality constant to account for a change in the local channel exhaust gas velocity in the channel based on a change in the channel length and to yield a new local channel exhaust gas velocity; and selecting a new channel length based on a deviation between the new local channel exhaust gas velocity and the average exhaust velocity so as to provide a more-uniform residence time of the engine exhaust in the channel, based on the residence time of the engine exhaust in other channels in the honeycomb body.

A third aspect pertains to a method of manufacturing an engine exhaust gas treatment article, the method comprising shaping a honeycomb body a honeycomb body comprising a longitudinal axis, a maximum axial length, a minimum axial length, a plurality of channel walls extending from an inlet end face to an outlet end face defining cell channels therebetween, and a radial area perpendicular to the longitudinal axis, and an outer periphery extending from the inlet end face to the outlet end face, wherein at least one of the inlet end face and the outlet end face of the honeycomb body includes a contour surface that provides a uniform exhaust gas residence time across the radial area of the honeycomb body that yields a reduction of at least 20% in the ratio of maximum residence to minimum residence of substrate that has flat surfaces on both ends when exhaust gas is flowed through the honeycomb body

Figure 3:
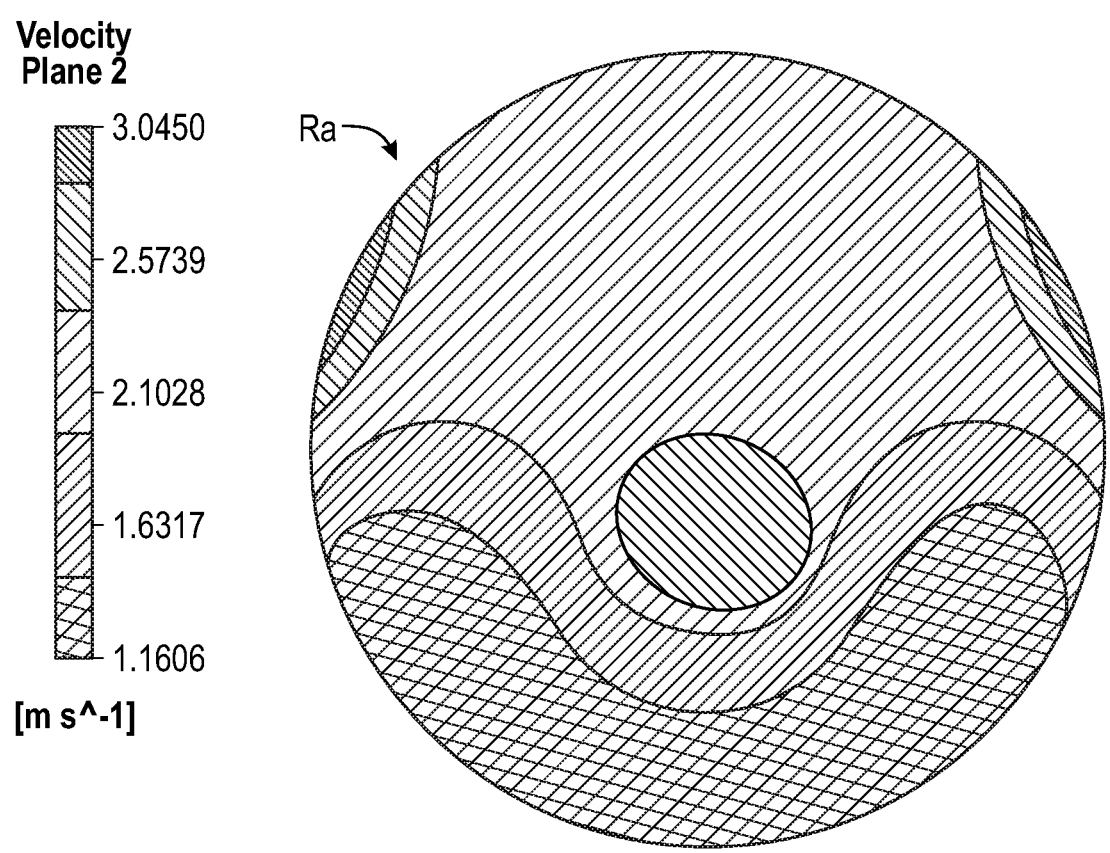
Figure 5:
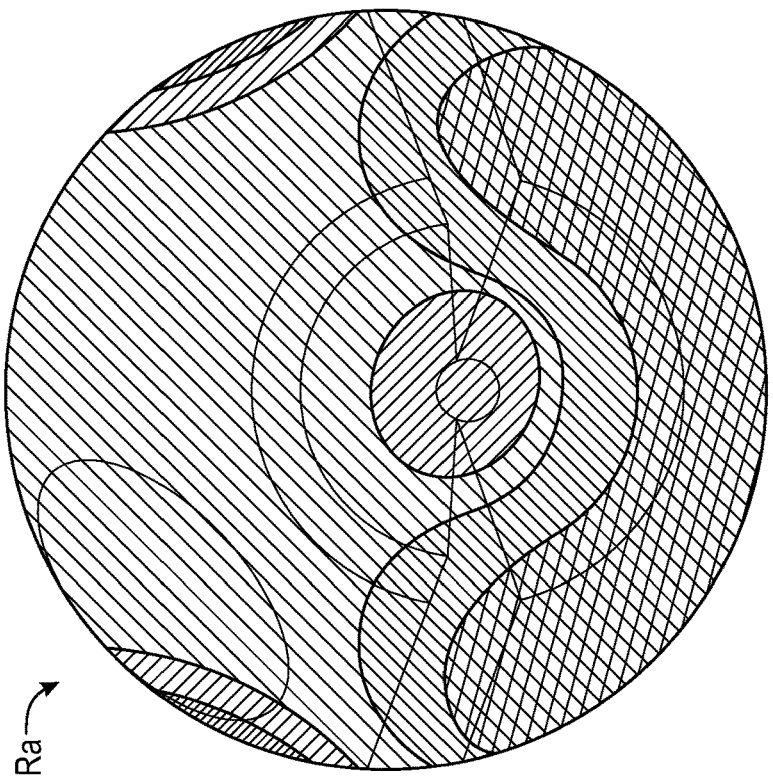
Figure 5:
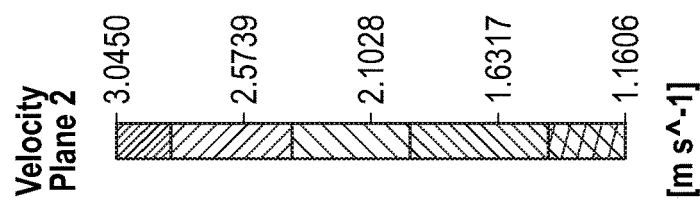
Figure 4:
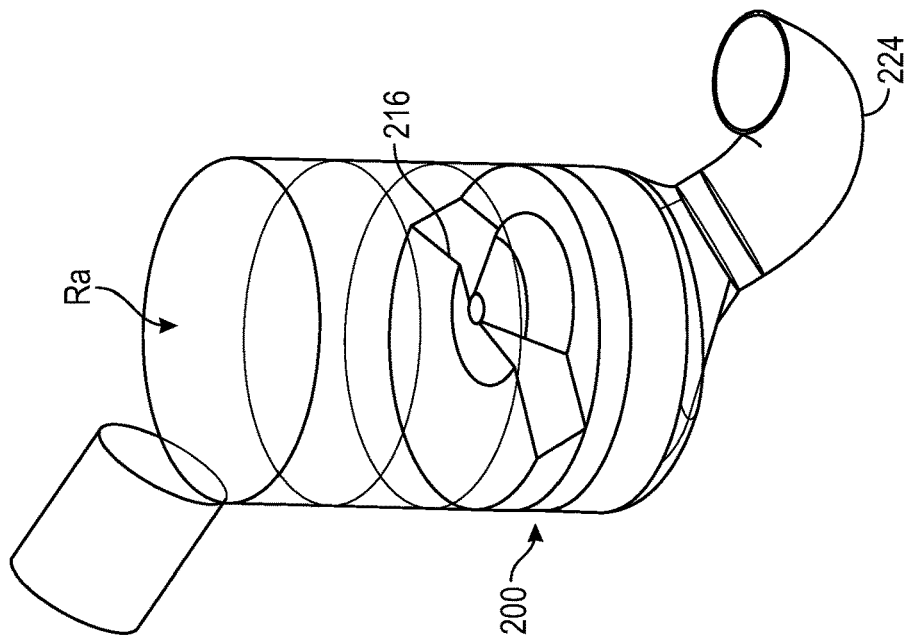
Figure 6:
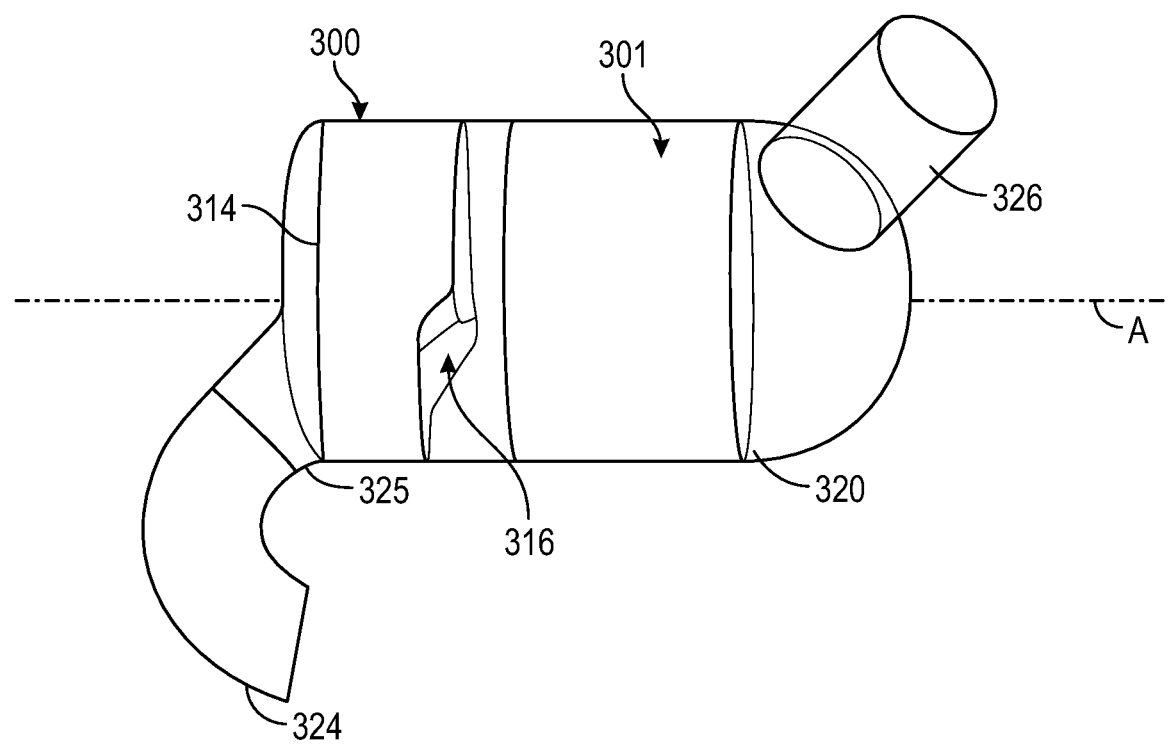
Figure 7:
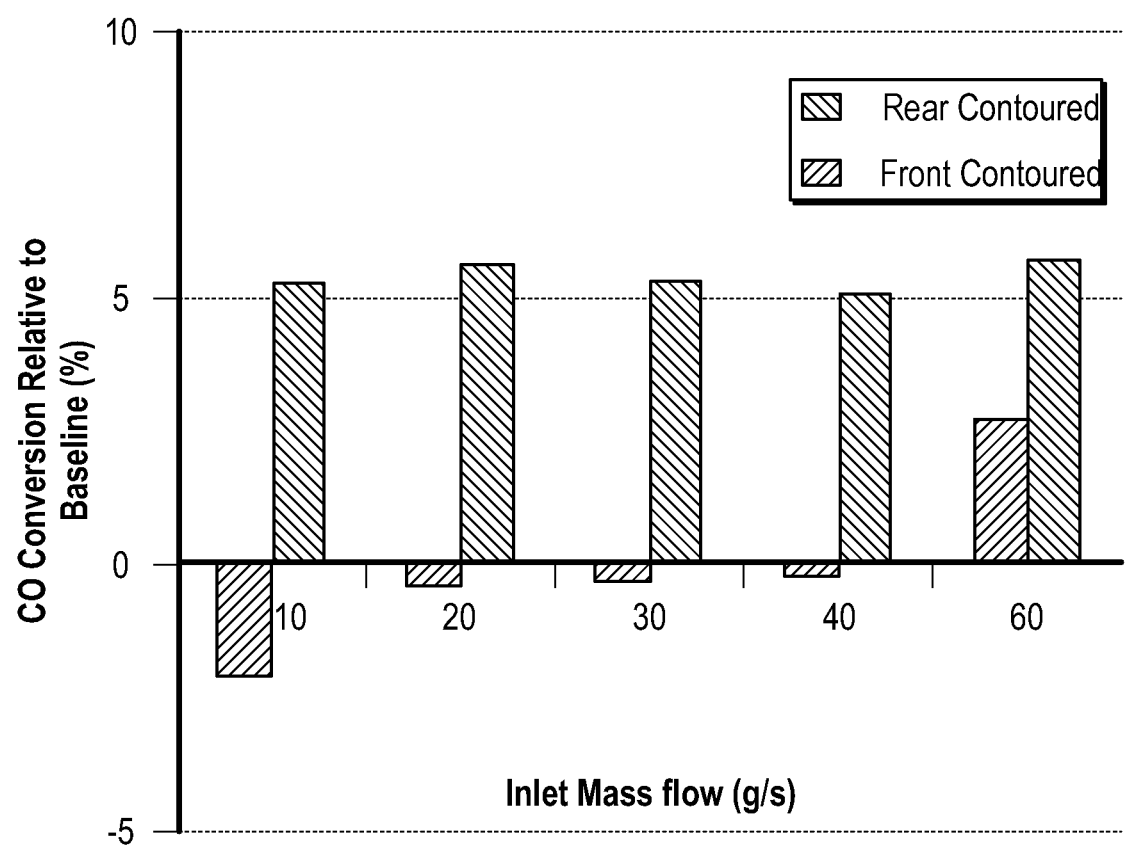
Figure 8:
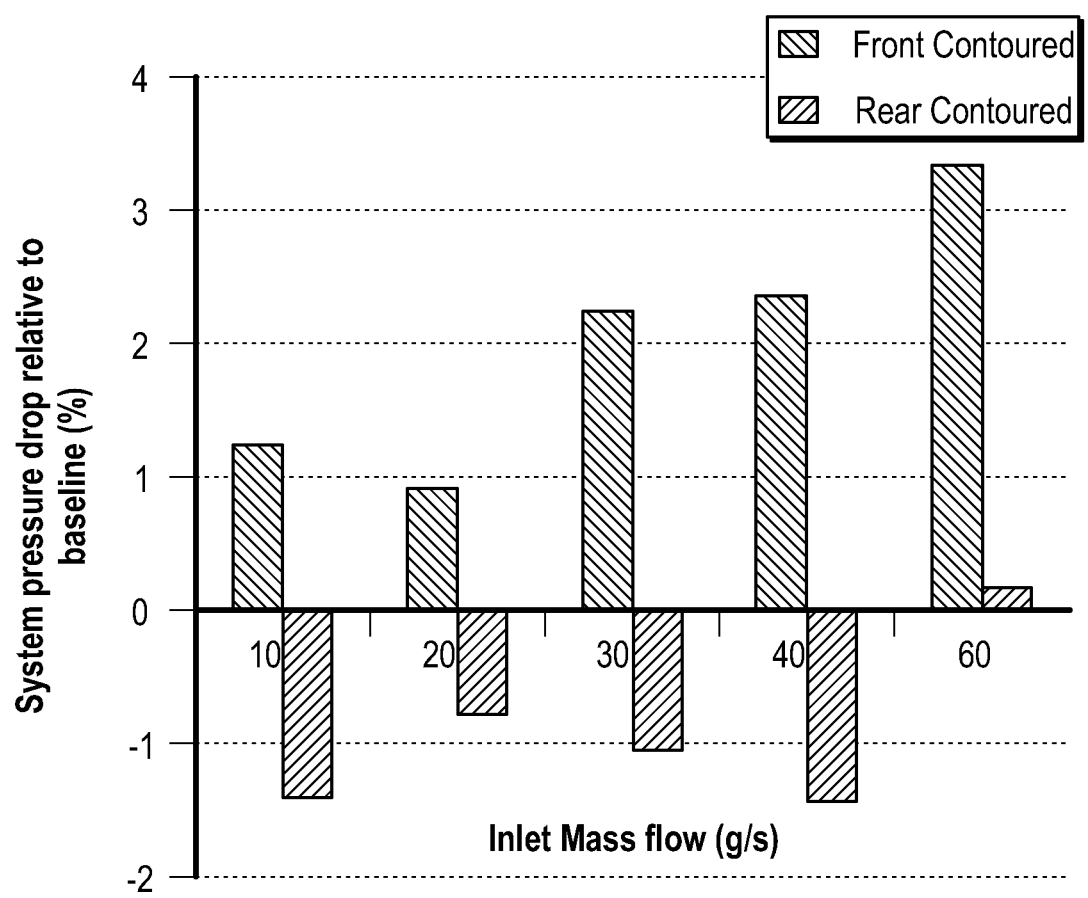
Figure 9:
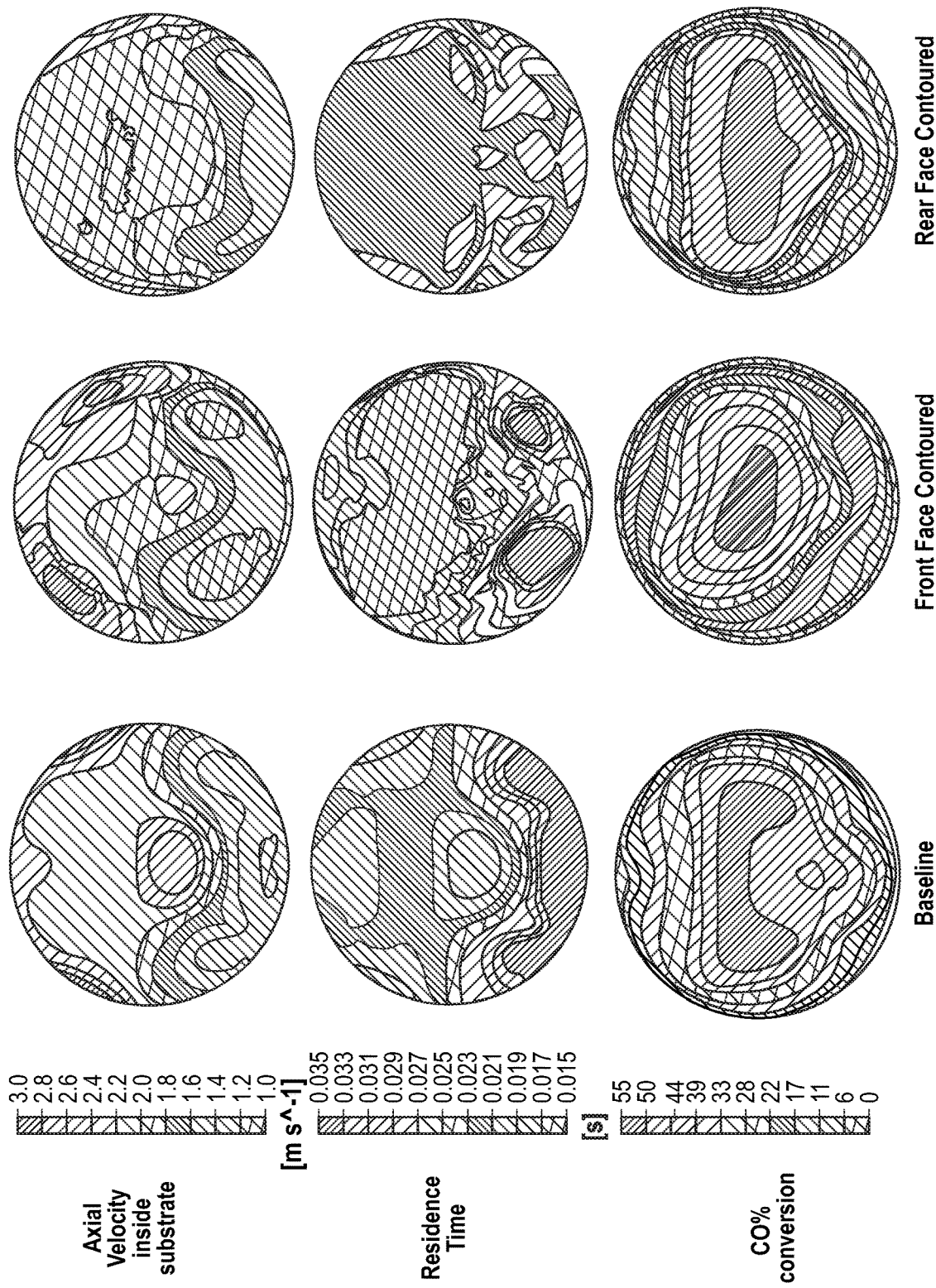
Figure 10:
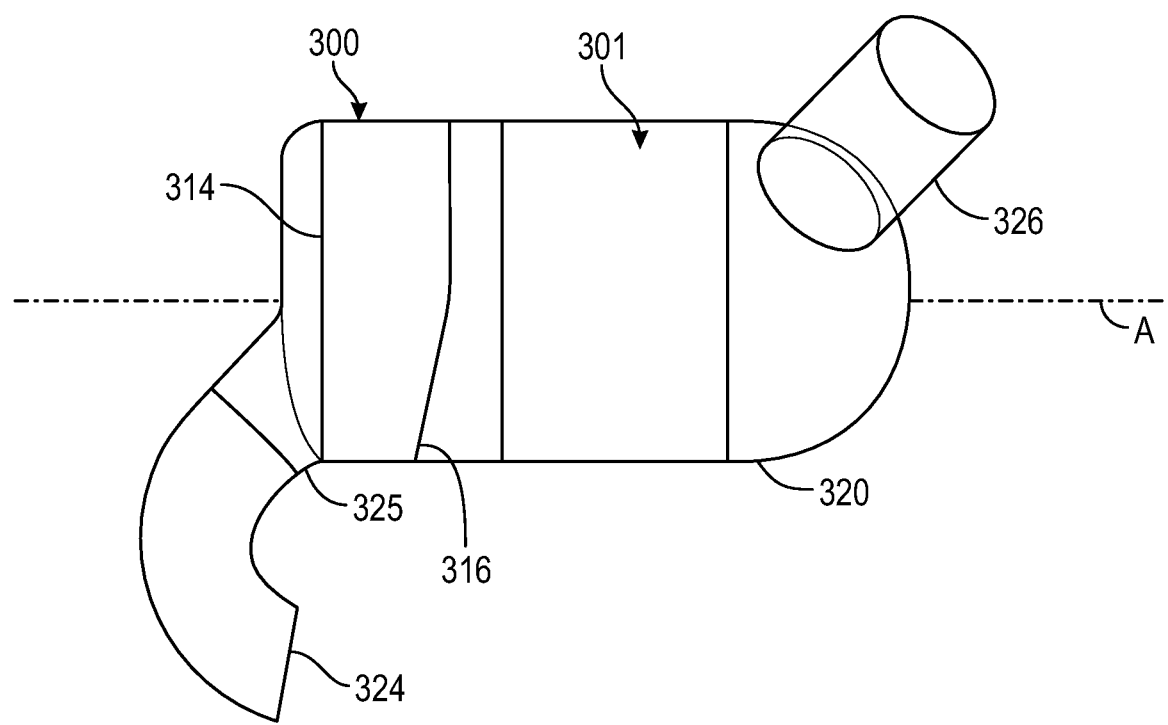
Figure 11:
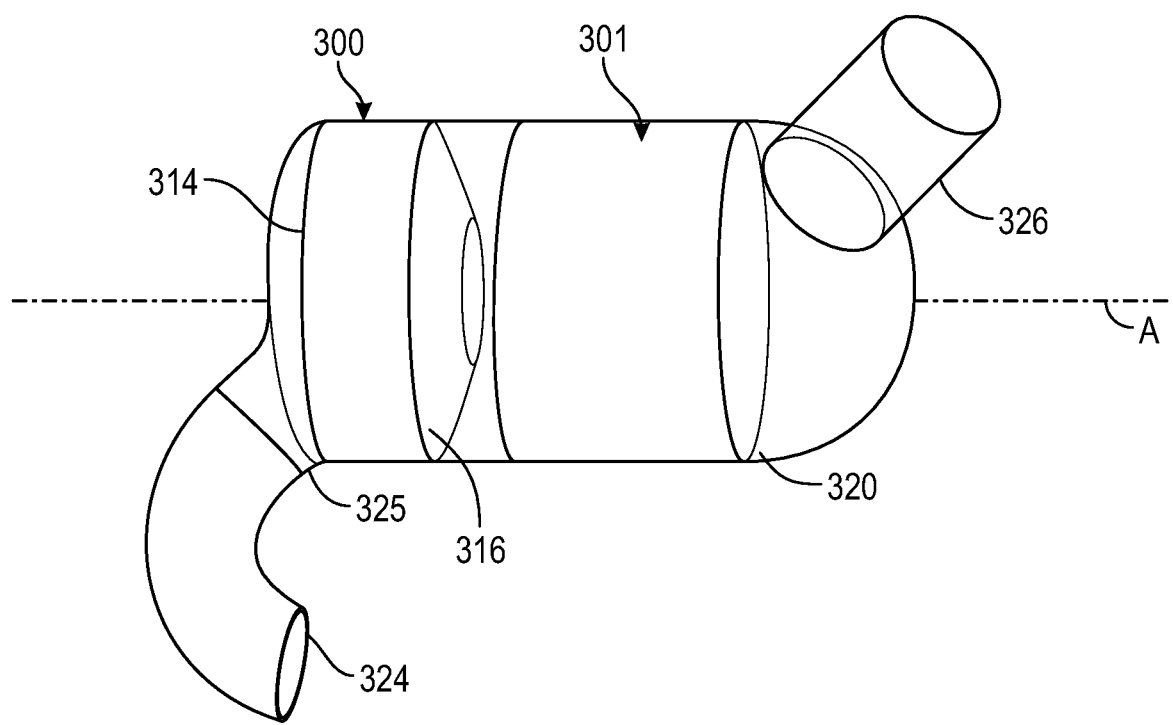
Figure 12:
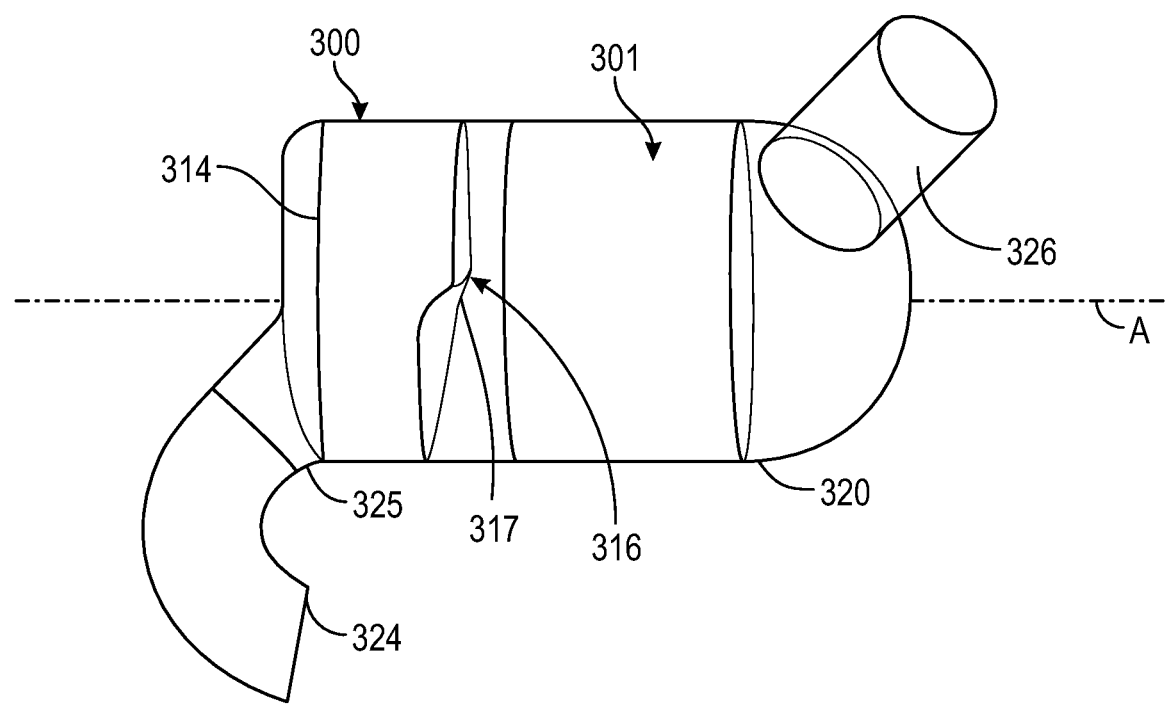
Figure 13:
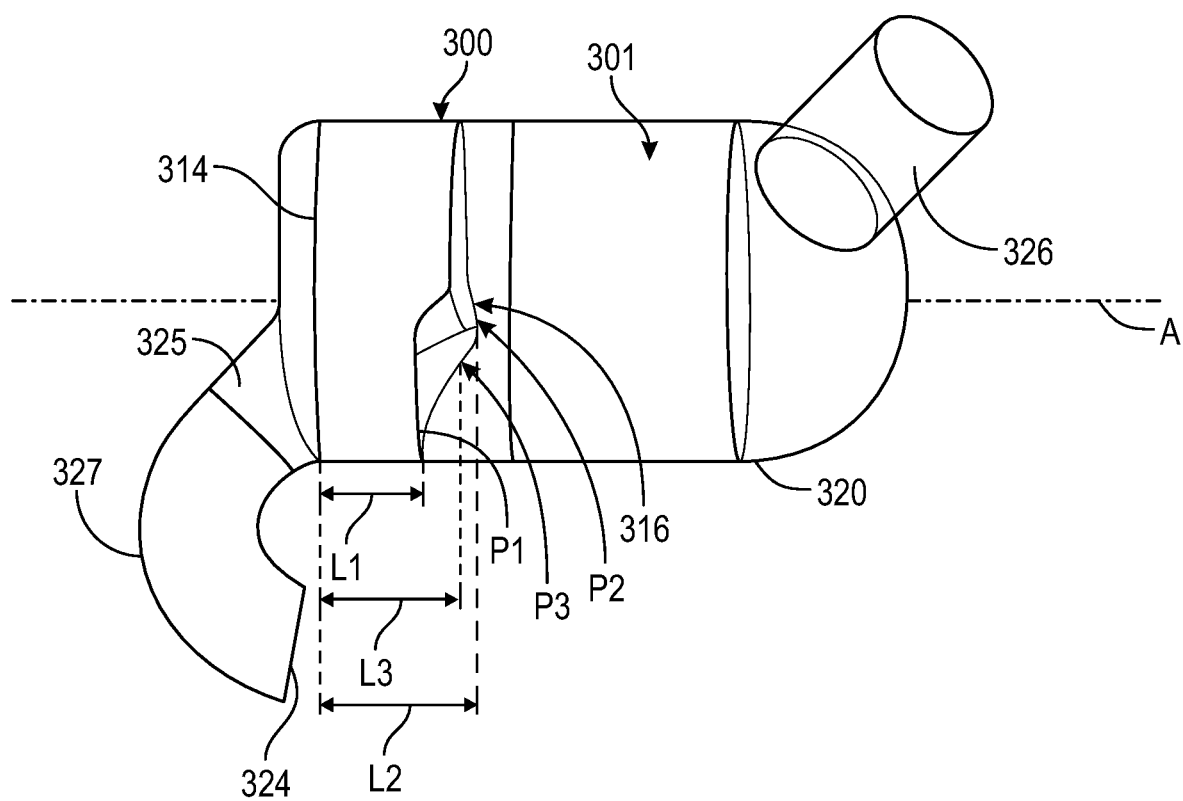
Figure 14:
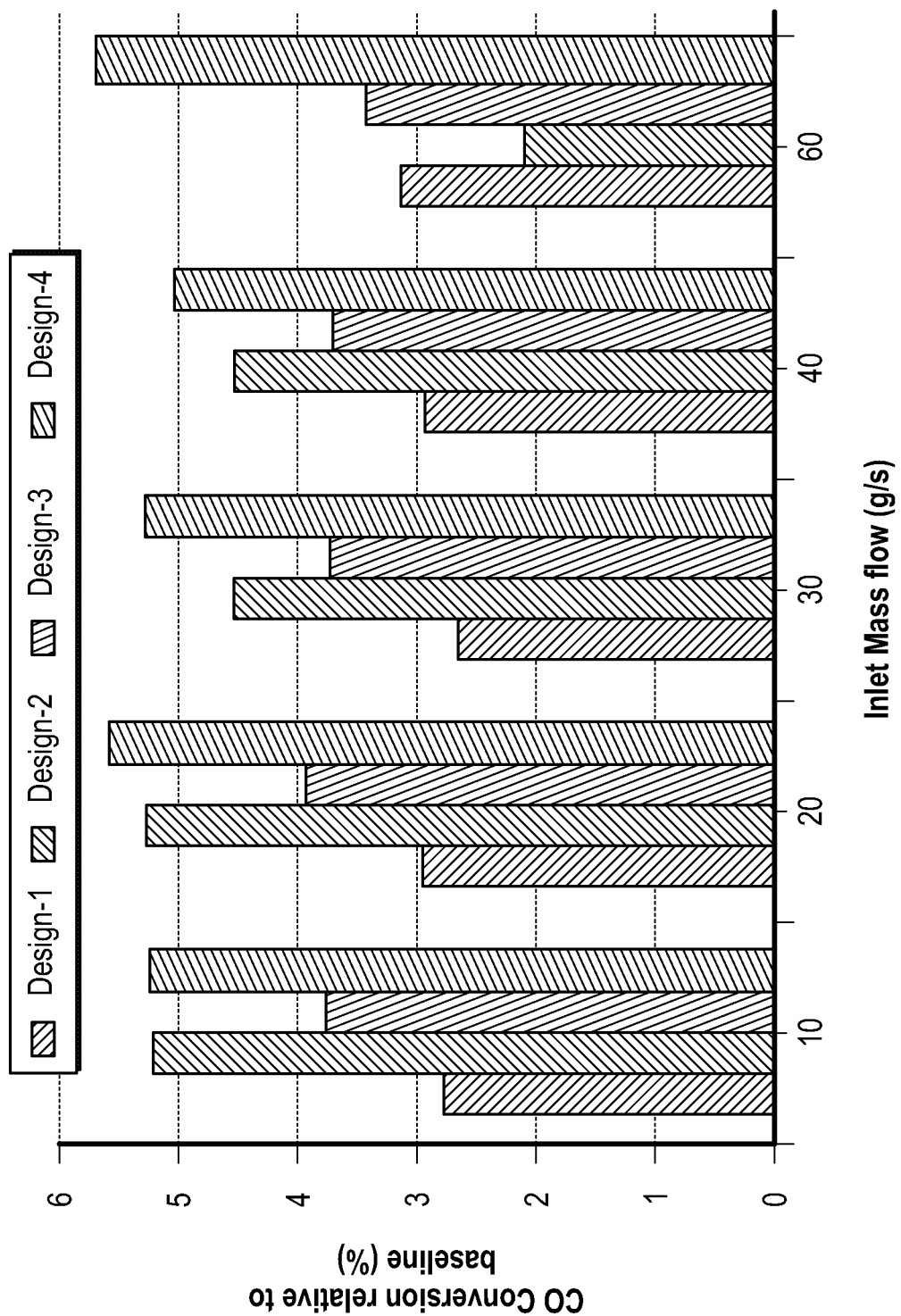
Figure 15:
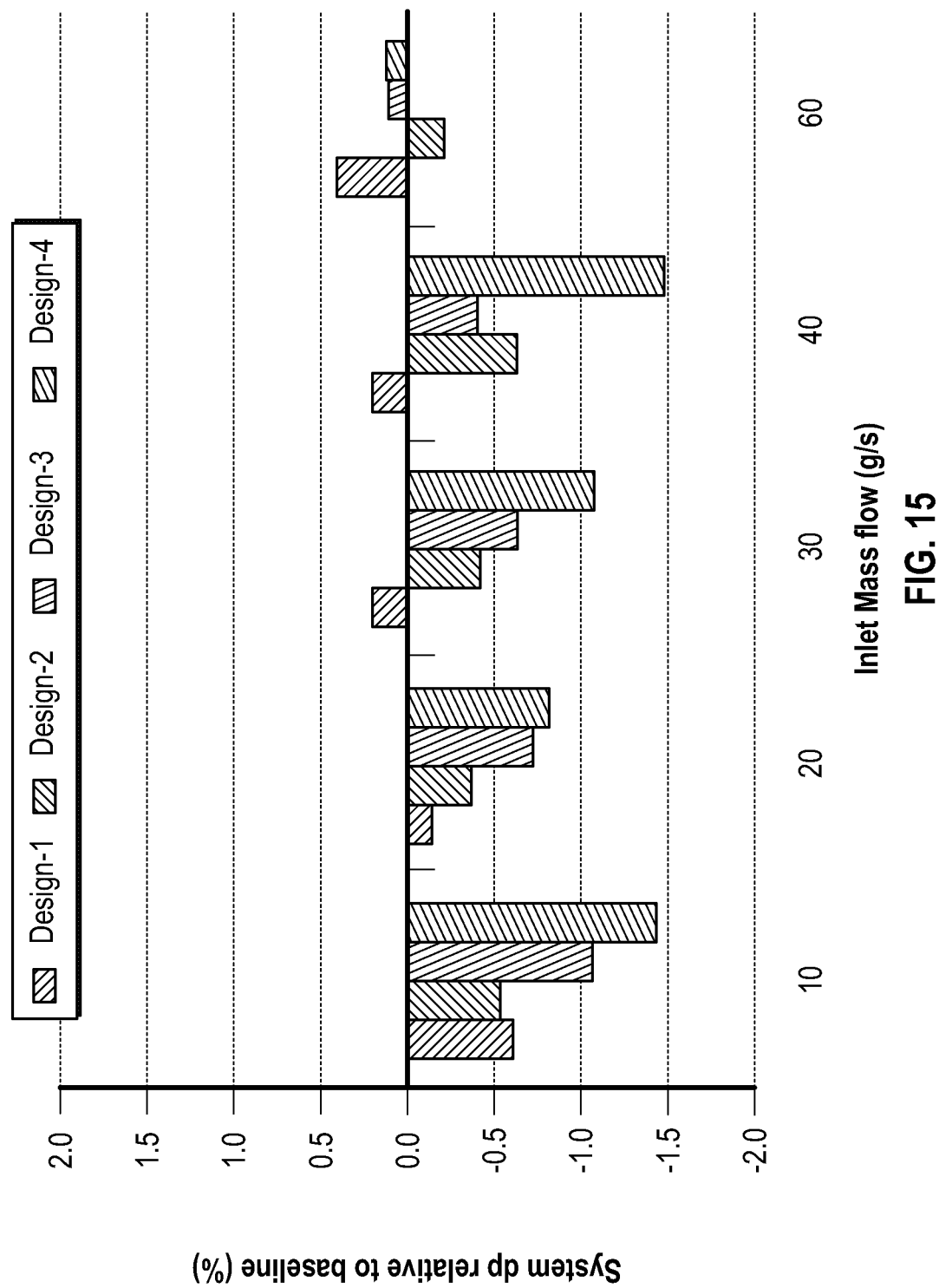

honeycomb body with a flat inlet end face and a flat outlet end face, an initially contoured substrate with a contoured outlet end face;

FIG. 3 shows the two dimensional velocity distribution across the baseline (standard) substrate with flat end faces;

FIG. 4 shows an exemplary embodiment of a honeycomb body with a contoured outlet end face;

FIG. 5 a graph showing an overlay e-of the initial flow distribution (from non-contoured baseline case) onto the calculated contour to demonstrate how the desired contour pattern correlates to the initial flow distribution;

FIG. 6 shows an exemplary embodiment of an exhaust gas treatment article comprising honeycomb body with a contoured outlet end face upstream from a second honeycomb body;

FIG. 7 is a graph showing CO conversion for honeycomb bodies having a contour on the outlet end face (rear contoured) and a contour on the inlet end face (front contoured) compared to a baseline honeycomb body (both end faces flat);

FIG. 8 is a graph showing pressure drop for honeycomb bodies having a contour on the outlet end face (rear contoured) and a contour on the inlet end face (front contoured) compared to a baseline honeycomb body (both end faces flat);

FIG. 9 is a graph comparing the axial velocity, residence time, and CO conversion across the first substrate for three honeycomb body designs;

FIG. 10 is an exemplary embodiment of an exhaust gas treatment article comprising a first design of a honeycomb body with a contoured outlet end face;

FIG. 11 is an exemplary embodiment of an exhaust gas treatment article comprising a second design of a honeycomb body with a contoured outlet end face;

FIG. 12 is an exemplary embodiment of an exhaust gas treatment article comprising a third design of a honeycomb body with a contoured outlet end face;

FIG. 13 is an exemplary embodiment of an exhaust gas treatment article comprising a fourth design of a honeycomb body with a contoured outlet end face;

FIG. 14 is a graph comparing CO conversion of the designs shown in FIGS. 10-13 with a baseline design honeycomb body; and FIG. 15 is a graph comparing pressure drop of the designs shown in FIGS. 10-13 with a baseline design honeycomb body.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

Exemplary embodiments of the disclosure relate to an improved exhaust gas treatment article. In one or more embodiments, the exhaust gas treatment article comprises a honeycomb body comprising a longitudinal axis, a maximum axial length, a minimum axial length, a plurality of channel walls extending from an inlet end face to an outlet end face defining cell channels between the inlet end face and the outlet end face, a radial area, and an outer periphery extending from the inlet end face to the outlet end face, wherein at least one of the inlet end face and the outlet end face of the honeycomb body includes a contour surface that provides a uniform exhaust gas residence time across the radial area of the honeycomb body perpendicular to the longitudinal axis that yields a reduction of at least 20% in the ratio of maximum residence to minimum residence of substrate that has flat surfaces on both ends when exhaust gas is flowed through the honeycomb body.

In specific embodiments, the exhaust gas treatment article further comprises including a honeycomb body mounted in a housing such as a metal housing. The exhaust gas treatment article may be part of an exhaust gas treatment system to clean exhaust gases.

Automobile (e.g., car, truck, and motorcycle) as well as stationary catalytic converter honeycomb substrates are typically mounted inside housings (cans). A fiber mat can be placed around the honeycomb body to minimize the effects of vibration and movement. As the honeycomb body and housing become hot and the metal housing expands in diameter and length, the mat acts as a buffer, taking up the additional space, thus protecting the honeycomb body from movement The manufacture of porous ceramic honeycomb bodies may be accomplished by the process of plasticizing ceramic powder batch mixtures, extruding the mixtures through honeycomb extrusion dies to form honeycomb extrudate, and cutting, drying, and firing the extrudate to produce ceramic honeycomb bodies of high strength and thermal durability having channels extending axially from a first end face to a second end face.

A co-extruded or an after-applied exterior skin may form an outer peripheral surface extending axially from a first end face to a second end face of the ceramic honeycomb bodies. Each channel of the honeycomb bodies defined by intersecting walls (webs), whether monolithic or segmented, can be plugged at an inlet end face or an outlet end face to produce a filter. When some channels are left unplugged a partial filter can be produced. The honeycomb body, whether monolithic or segmented, can be catalyzed to produce a substrate. A non-plugged honeycomb body is generally referred to herein as a substrate. The catalyzed substrate can have an after applied catalyst or comprise an extruded catalyst. Further, filters and partial filters can be catalyzed to provide multi-functionality. The ceramic honeycomb bodies thus produced are widely used as catalysts, catalyst supports, membrane supports, as wall-flow filters, as partial filters, and as combinations thereof for cleaning fluids such as engine exhausts.

Ceramic honeycomb body compositions are not particularly limited and can comprise major and minor amounts of cordierite, aluminum-titanate, mullite, β-spodumene, silicon carbide, zeolite and the like, and combinations thereof. As a further example, the ceramic honeycomb body can comprise an extruded zeolite or other extruded catalyst.

Ceramic honeycomb bodies may be disposed in a housing (can) in an exhaust system. The housing may be referred to as a can and the process of disposing the ceramic honeycomb body in the can may be referred to as canning.

Figure 1:
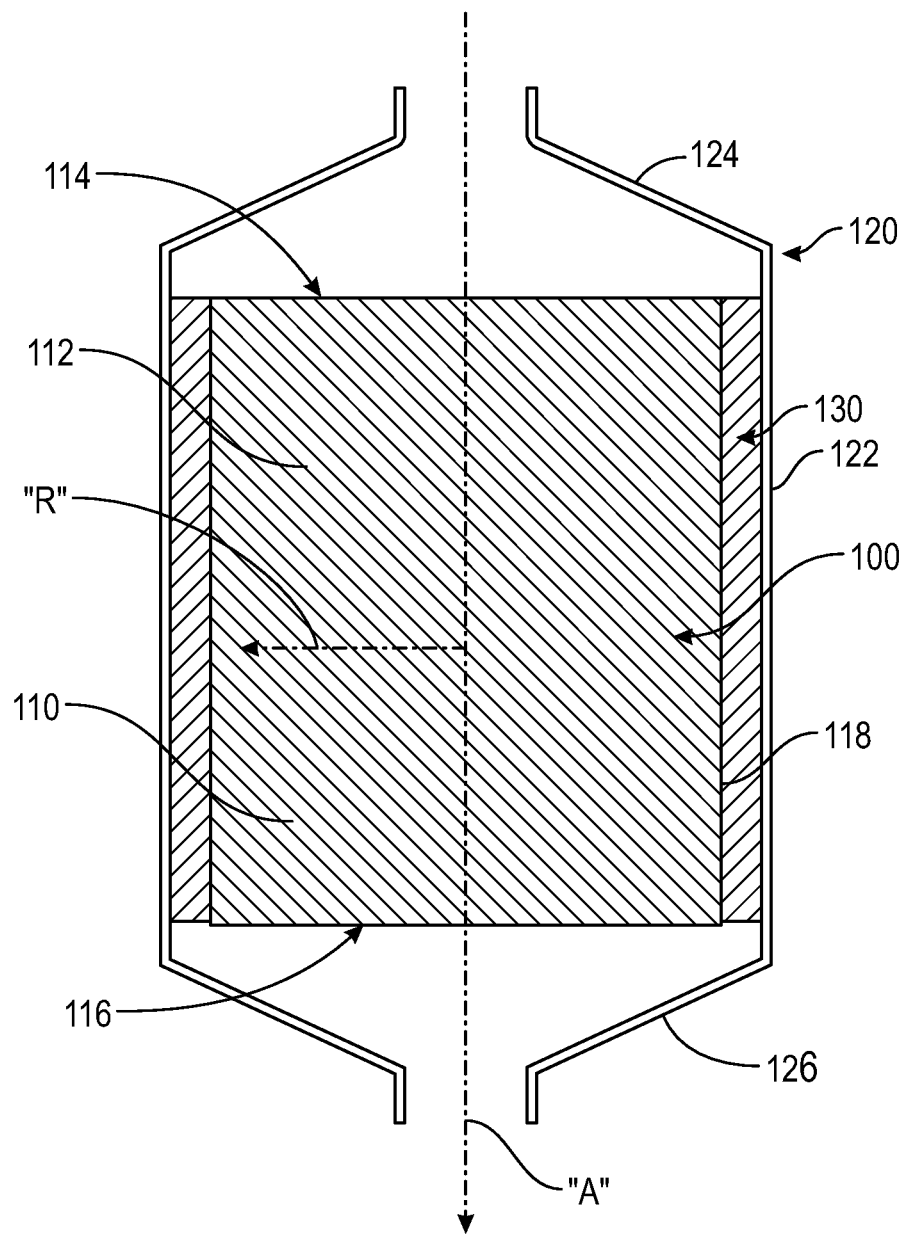
FIG. 1 presents a schematic cross sectional view of a conventional arrangement of a honeycomb body canned with a mat.

FIG. 1 shows a schematic cross sectional view of a conventional arrangement of a honeycomb body canned with a mat. The honeycomb body 100 includes a plurality of intersecting channel walls 110 that form mutually adjoining cell channels 112 extending axially between opposing end faces 114, 116, which may be an inlet end face 114 and an outlet end face of the honeycomb body 100. The outer peripheral surface 118 of the honeycomb body 100 extends axially from the inlet end face 114 to the outlet end face 116.

Cell density can be between about 100 and 900 cells per square inch (cpsi). Typical cell wall thicknesses can range from about 0.025 mm to about 1.5 mm (about 1 to 60 mil).

For example, honeycomb body 100 geometries may be 400 cpsi with a wall thickness of about 8 mil (400/8) or with a wall thickness of about 6 mil (400/6). Other geometries include, for example, 100/17, 200/12, 200/19, 270/19, 600/4, 400/4, 600/3, 600/2, 750/2 and 900/2. As used herein, honeycomb body 100 is intended to include a generally honeycomb structure but is not strictly limited to a square structure. For example, hexagonal, octagonal, triangular, rectangular or any other suitable cell shape may be used. Also, while the cross section of the cellular honeycomb body 100 is circular, it is not so limited, for example, the cross section can be elliptical, square, rectangular, or other desired shape, and a combination thereof.

The housing (can) 120 includes an axial section 122 covering the outer peripheral surface 118 of the honeycomb body 100 and funnel-shaped first and second exhaust gas conduits 124, 126 that may correspond to inlet and outlet of the exhaust gas treatment article. The housing 120 is generally fabricated of metal or other material that is impermeable to gases, and is configured to contain one or more honeycomb bodies 100. For example, the housing can comprise aluminum, stainless steel such as 400-series stainless steel or 300-series stainless steel, titanium alloy, titanium, and the like. Exhaust gases flow through the honeycomb body 100 in the general axial direction along the longitudinal axis of the honeycomb body 100 as indicated by arrow "A," including through the channels 112 that may or may not be catalyzed, and in the case of filters, through the channel walls 110. A mat 130 can be placed around the honeycomb body 100 to minimize the effects of vibration and movement.

It has been determined that the conversion performance, and hence catalyst utilization, depends on the flow residence time and temperature, rather than flow rate or velocity across the substrate. The general problem of optimization of flow residence time across the radial area of the honeycomb body perpendicular to the longitudinal axis is very complex and multifaceted. According to one or more embodiments honeycomb bodies are described that exhibit improved radial residence time and temperature distributions of exhaust gas flowing through a honeycomb substrate across the radial area of the honeycomb body perpendicular to the longitudinal axis, while maximizing the average temperature of the system. The outlet end contour designs according to one or more embodiments results in an improvement of the flow distribution, which results in better and more uniform heating of the entire substrate by the incoming gas, particularly the periphery areas, and thus utilizing the catalyst throughout the substrate more uniformly. Existing designs without a contoured outlet end face results in a hot zone in the center and a cool region on the periphery, and since reaction rates are affected exponentially by temperature, this causes non-uniform catalyst utilization.

According to one or more embodiments, for a well-insulated exhaust gas treatment system including a honeycomb body, the honeycomb substrates provide both optimized thermal and residence time profiles across the radial area of the honeycomb body perpendicular to the longitudinal axis. A new contour honeycomb outlet end face design methodology targeting residence time uniformity is provided in one or more embodiments. According to one or more embodiments, it has been determined that that contouring of the outlet end face (flow exit) of the substrate provides improved results compared with contouring the inlet end face (flow inlet), particularly in space-restricted applications, such as in close-coupled exhaust gas system designs.

In one or more embodiments, a design methodology is described that provides a customized contoured shape to the outlet end face of a honeycomb body and substrate design options related to honeycomb body, which can result in performance augmentation in exhaust gas after-treatment systems having complex upstream hardware in terms of pipe bends and exhaust gas conduit shapes.

It was determined through modeling studies that when the shape of the inlet end face of a honeycomb body is provided with a conical contour, such that the center portion has a greater length than the radially outward portion, the radial center portion of the honeycomb body exhibits a higher resistance to flow, while the radially outward portion exhibits a lower resistance to flow. This kind of axisymmetric design of the inlet end face of the substrate is beneficial when the honeycomb body is placed downstream from an exhaust gas inlet conduit that is an axisymmetric conduit, and hence inlet exhaust gas flow is also axisymmetric with respect to the honeycomb body, such that higher flow is naturally directed to the center and lower flow towards the periphery. FIG. 1 shows an example of an exhaust inlet having an exhaust gas inlet conduit 124 that is axisymmetric and in the shape of an axisymmetric cone. As used herein, "axisymmetric" refers to an end face of a honeycomb substrate that has an identical contour on each side of a center longitudinal axis of a honeycomb substrate.

When the inlet conduit 124 is not axisymmetric with respect to the longitudinal axis of the honeycomb body and the inlet exhaust gas conduit that is in flow communication with the inlet conduit has sharp bends, e.g. a 90-degree bend or a U-bend, which is often the case in close-coupled exhaust gas treatment systems, it was determined that contouring the inlet end face 114 of the honeycomb body 100 was not effective to provide greater uniformity in the flow residence time and temperature across the radial area of the honeycomb body perpendicular to the longitudinal axis. In fact, it was determined that in such scenarios, contouring the inlet end face 114 deteriorates the catalytic converter performance due to a resulting side-effect on the upstream flow recirculation and separation. Additionally, due to a common space limitation in the inlet exhaust gas conduit designs, the contouring design window may be small or proper contouring may not be possible.

Therefore, according to one or more embodiments, instead of contouring of the inlet end face of substrate, the outlet end face 116 of the honeycomb body 100 comprises a contoured shape. Furthermore, embodiments of the disclosure provide a method of manufacturing a honeycomb body that includes a calculation to optimize the shape of the honeycomb body 100 outlet end face 116 based on the objective of maintaining a uniform gas residence time the radial area of the honeycomb body 100 perpendicular to the longitudinal axis. One or more embodiments described herein, which include maintaining a uniform gas residence time the radial area of the honeycomb body perpendicular to the longitudinal axis are distinguished from prior methods which aimed at flow uniformity.

It was found that honeycomb body designs having a contoured outlet end face 116 were found to perform superior to front-face contouring because they do not appreciably alter the flow recirculation and separation pattern in the inlet exhaust gas conduit, which could otherwise deteriorate performance. Honeycomb bodies in accordance with one or more embodiments described therein exhibit better overall and faster thermal response and reduced heat losses in the inlet exhaust gas conduit, which leads to higher conversion in cold-start as well as in steady-state operation.

According to one or more embodiments, the honeycomb bodies described herein provide a broader design window where there is limited space in the exhaust gas inlet conduit 124. The use of contours on the outlet end face 116 can allow for more aggressive bends in inlet conduits 124, and thus enable catalyst placement closer to engine. In one or more embodiments, optimization of the contoured shape of the outlet end face 116, with the aim of achieving a uniform residence time across the radial area of the honeycomb body perpendicular to the longitudinal axis (rather than uniform flow), provides for more effective utilization of the catalyst and minimizes substrate hot spots that can arise due to high local reaction rates. In some embodiments, this leads to higher overall conversion and longer catalyst life.

According to one or more embodiments, contouring the outlet end face 116 for improved catalyst utilization and flow distribution would also potentially enable use of shorter substrates in the manufacture of the honeycomb body 100. Shorter substrates are desirable due to their low backpressure, but they inherently suffer from significant flow non-uniformities due to low flow resistance. Contouring the outlet end face can provide desired flow distribution, while allowing for decreased backpressure. Typical close-coupled systems consist of two substrates in series, with sensors placed in a gap between them or in a machined sensor groove in the front substrate. Contouring of the outlet end face 116 of the front honeycomb body (closest to the engine) should allow for easier positioning of sensors between the two substrates within the "removed" volume, while at the same time improving the flow distribution and moving the honeycomb bodies closer together. According to one or more embodiments, "close coupled" refers to positioning a honeycomb body within less than eighteen inches (45.72 cm) of the engine exhaust manifold, and in some embodiments, within less than six inches (15.24 cm) of the engine exhaust manifold.

Thus, standard cylindrical substrates typically suffer from non-uniform flow distribution (varying flow rates in various channels) across the radial area perpendicular to the longitudinal axis of the honeycomb body due to upstream geometry, e.g. piping, expansion conduits, etc. The flow is typically highest in the central regions across the radial area and lowest on the periphery of the radial surface, causing a two-fold issue. On the periphery, such non-uniformity results in underutilization of the expensive catalyst, containing rare platinum-group metals (PGMs), such as rhodium, palladium, and platinum. On the other hand, the catalyst in the central region of the honeycomb body is over-utilized, and the high rates of the exothermal three-way catalyst reactions can cause excessive temperatures, leading to faster catalyst aging and deactivation.

According to one or more embodiments, the flow is more uniform across the radial area of the substrate compared to a substrate having a flat outlet end face. Conversion performance, and hence catalyst utilization, depends on the flow residence time and temperature, rather than flow rate or velocity. The general optimization problem is very complex and multifaceted, but it can be made more tractable by restricting the solution space through the following optimization function: we aim to make more uniform the radial area residence time and temperature distributions, while maximizing the average temperature of the system. It can be shown, that for a well-insulated system, the thermal aspects of the optimization will naturally follow from the residence time optimization. Therefore, we have developed and implemented a new outlet end face contour design methodology targeting residence time uniformity. Furthermore, we have found that contouring of the outlet (flow exit) end face 116 of the honeycomb body is advantageous to contouring the inlet (flow inlet) end face 114, particularly in space-restricted applications, close-coupled applications In most catalytic substrates, flow in the individual channels is laminar due to the small size of the channels. Thus Hagen-Poiseuille equation describes the pressure drop, $\Delta P$, as a function of channel geometry, gas properties, and flow rate:

$$\Delta P_i = 32 \, \mu L_i v_i / d^2 \tag{1}$$

where subscript i refers to a given channel in the substrate, $\Delta P$ is the exhaust gas viscosity under local conditions, L is the channel length, v is the exhaust gas average velocity in the channel, and d is the hydraulic diameter of the channel. The validity of this can and has been validated by modeling the standard honeycomb bodies and correlating the local pressure drop to local channel velocity.

Next, assuming $\Delta P$, $\mu$, and d are fixed for a particular channel, we find that channel velocity scales with channel length:

$$v_i = C_i / L_i \tag{2}$$

where C is the proportionality constant. Therefore, given the inlet end face pressure and thermal profile from the baseline (standard honeycomb body with flat end faces) model, we can directly manipulate and optimize the velocity distribution within the substrate through channel length distribution design—contouring. Since contouring may slightly impact the upstream flow and hence pressure and gas viscosity, this scaling is approximate and in some cases iteration may be required to obtain an optimized contour. In our experience, the flow disturbance is typically minimal and a converged solution is obtained in one to two iterations.

If the objective function were uniform flow distribution, then we can derive the optimized contour channel length distribution to be:

$$L_{cont,i} = L_{avg} v_{std,i} / v_{avg} \tag{3}$$

where $L_{cont,i}$ is the optimized length for the i-th channel, $L_{avg}$ is equal to the length of the standard substrate (keeping the substrate volume fixed), $v_{std,i}$ is the velocity in the i-th channel from the baseline (standard substrate) simulation, and $v_{avg}$ can be calculated from the total flow rate or by averaging the velocities from the baseline simulation.

As mentioned above, our contouring strategy is to achieve uniform residence time (not velocity) across all channels:

$$\tau_{avg} = \tau_i = L_i / v_i \tag{4}$$

Since residence time depends on both velocity and channel length, we have re-derived our optimized contour channel length distribution with the residence time uniformity objective function, to be:

$$L_{cont,i} = L_{avg} \sqrt{\frac{v_{std,i}}{v_{avg}}}, \tag{5}$$

where once again all terms on the right hand side can be obtained from the baseline (standard substrate) simulation.

At this point we check the residence time distribution of the contoured substrate, and if the uniformity is not sufficient (due to slight upstream flow change), then iterations can be performed on the contour as follows:

$$L_{new,i} = L_{old,i} \sqrt{\frac{\tau_{avg}}{\tau_{old,i}}}. \tag{6}$$

Figure 2:
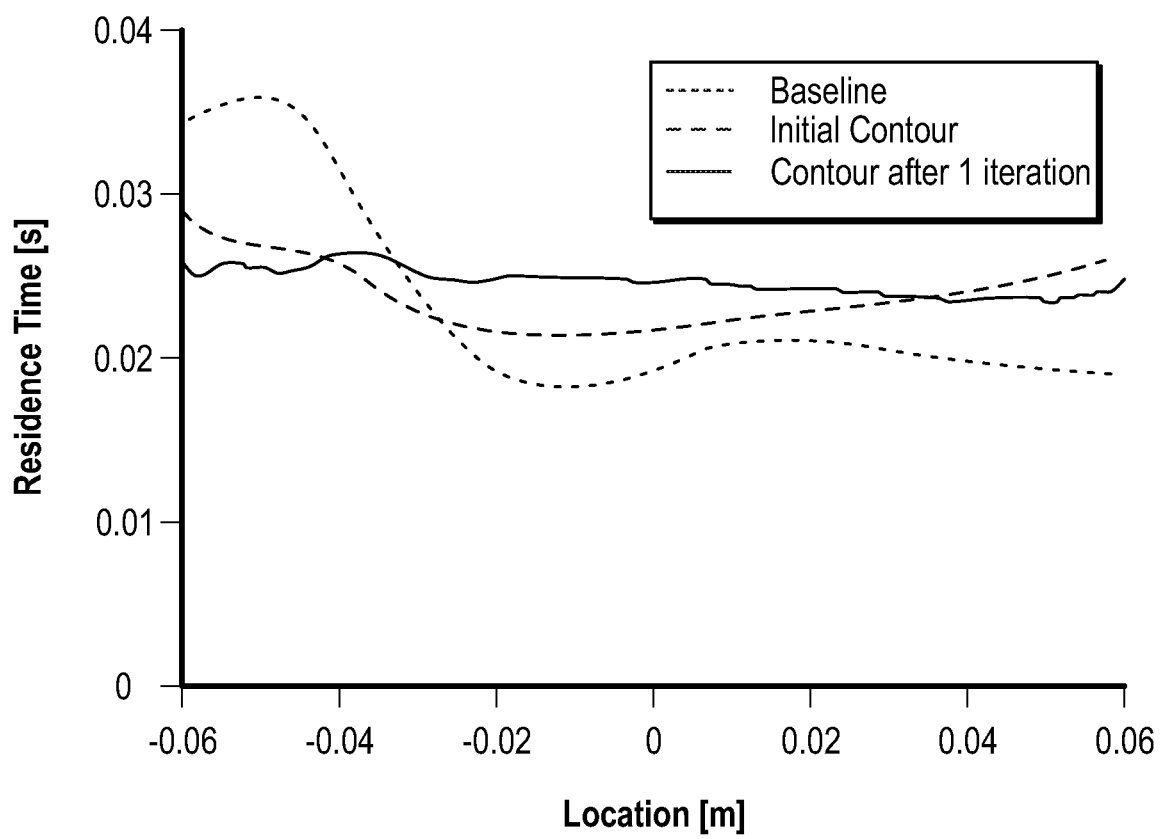
FIG. 2 is a graphical depiction showing residence time on the Y-axis versus radial location for an existing "baseline"

Following is an illustrative example of application of this procedure to one of the studied systems. FIG. 2 depicts the centerline residence time profile after initial contouring and after one iteration. The profile was created by modelling the flow distribution for the given exhaust geometry with a cylindrical, non-contoured substrate, then using the calculated flow distribution to design the initial contour (using the outlined procedure). The new flow distribution was then modeled with this contoured substrate, then re-calculating the contour to improve the distribution further (this is the contour after one iteration), and then the procedure can be repeated iteratively until the desired flow uniformity level is reached. The Y-axis of FIG. 2 is the residence time, and the X-axis is the radial location of the residence time, with zero being the center of the substrate along the longitudinal axis (as shown in FIG. 1). As can be seen from FIG. 2, the uniformity residence time uniformity across the radial area of the substrate FIG. 3 shows the two dimensional velocity distribution across the baseline (standard) substrate with flat end faces. FIG. 4 shows a honeycomb body 200 with a contoured outlet end face 216 and an inlet exhaust gas conduit 224 with a U-shaped bend. FIG. 5 shows an overlay of the initial flow distribution (from a non-contoured baseline case) onto the calculated contour to demonstrate how the desired contour pattern correlates to the initial flow distribution.

FIG. 6 shows an exemplary embodiment of a honeycomb body 300 with a contoured outlet end face 316 upstream from a second honeycomb body 301. The inlet conduit 324 has a U-shaped bend and the outlet conduit 326 is downstream from the second honeycomb body. The design shown is a two honeycomb ("two-brick") design of a close-coupled after-treatment system, where the inlet exhaust gas conduit 324 has a sharp U-shaped bend and the outlet conduit 326 is offset with respect to the longitudinal axis "A" of the honeycomb body 300. This system also has limited space in front of the first substrate with a peculiar shape of inlet expansion conduit 325 connecting exhaust gas inlet conduit 324 to the catalyst housing 320.

FIGS. 7 and 8 demonstrate the improved CO conversion and the relative pressure drop advantage of the outlet end face contoured honeycomb body vs. standard (baseline-flat on both end faces) and the inlet end face contoured honeycomb bodies for a typical range of light-duty engine exhaust flow rates. The "relative %" values are calculated as follows: 100%*(contoured value−baseline value)/baseline value. In FIG. 7, the darker bars show an improvement in CO conversion compared to the baseline for all mass flows for the honeycomb body having the outlet end face contour, while the lighter bars showed no improvement in CO conversion for a honeycomb body with the inlet end face contoured, except at 60 g/s. In FIG. 8, the lighter bars (inlet end face contour) showed a higher pressure drop versus the baseline, while the darker bars (outlet end face contour) showed a lower pressure drop for 10-14 g/s of inlet mass flow.

Velocity vector plots (not shown) were generated all three designs (standard with no end face contour (baseline), inlet end face contour (front face contoured) and outlet end face contour (rear face contoured). For the inlet end face contoured design, it was observed that the flow recirculation zones are affected, resulting in further maldistribution of flow and consequently increased backpressure, increased heat losses, and reduced pollutant conversion. On the contrary, the outlet end face contoured design does not alter the upstream flow recirculation patterns, makes the flow distribution uniform across the radial area perpendicular to the longitudinal axis, and results in increased pollutant conversion and reduced backpressure.

FIG. 9 compares the axial velocity, residence time, and CO conversion across the first substrate for all three designs (standard with no end face contour (baseline), inlet end face contour (front face contoured) and outlet end face contour (rear face contoured). Axial velocity plots demonstrate that for the standard (baseline) design there is an arc-shaped low velocity zone at the bottom of the honeycomb body and overall the flow distribution is not uniform, and this is also depicted in the residence time plot. The inlet end face contoured design is unable to substantially reduce the low velocity zone at the bottom and it also resulted in new high flow regions in the upper peripheral zone, thus this design failed to optimize the flow distribution and even resulted in lower CO conversion. With the outlet end face contoured design a relatively uniform flow field and residence time across the radial area of the honeycomb body perpendicular to the longitudinal axis, which has resulted in higher overall CO conversion.

FIGS. 10-13 show alternative embodiments of a honeycomb body 300 with a contoured outlet end face 316 upstream from a second honeycomb body 301. The inlet conduit 324 has a U-shaped bend and the outlet conduit 326 is downstream from the second honeycomb body. The design shown is a two honeycomb ("two-brick") design of a close-coupled after-treatment system, where the inlet exhaust gas conduit 324 has a sharp U-shaped bend and the outlet conduit 326 is offset with respect to the longitudinal axis "A" of the honeycomb body 300. This system also has limited space in front of the first substrate with a peculiar shape of inlet expansion conduit 325 connecting exhaust gas inlet conduit 324 to the catalyst housing 320.

FIG. 13 (Design 4) represents an optimized contoured design of outlet end face 316. FIGS. 10-12 represent other simplified contoured shapes of the outlet end face 316 that have been analyzed and found to provide benefits as well, but highest benefit was obtained with the optimized shape shown in FIG. 13. All these designs showed nearly same or slightly reduced backpressure as compared to baseline (standard cylindrical substrate with flat inlet end face and flat outlet end face) design. In FIG. 10 (Design 1), the outlet end face 316 has a lower half inclined face. In FIG. 11 (Design 2), the outlet end face 316 comprises a rear flat cone. In FIG. 12 (Design 3), outlet end face comprises a lower half cone, and a sensor is 317 is placed on outlet end face 316. FIG. 14 shows data for the increase in CO conversion versus the baseline case (flat inlet end face and flat outlet end face) for the designs shown in FIG. 10 (Design 1), FIG. 11 (Design 2), FIG. 12 (Design 3) and FIG. 13 (Design 4), and FIG. 14 shows pressure drop for each of these designs relative to the baseline.

According to one or more embodiments described herein, uniform residence time across the radial area of the honeycomb body perpendicular to the longitudinal axis will improve catalyst material utilization throughout the honeycomb body. In fact, in the ideal case of uniform radial temperature and residence time, this system would result in optimal catalyst utilization. While the proposed flow re-distribution improves the radial thermal uniformity, some gradients, particularly close to the periphery, will be present due to heat losses through canning and insulation to the ambient. Therefore further insulation can be beneficial, such as, for example, with the use of a low thermal mass double-concentric-pipe with an air/vacuum gap disposed within the housing. Such insulation concepts exist in the industry, but typically show minimal advantage in standard systems due to lower flow rates of exhaust on the periphery. However, with the proposed residence-time-optimized solution these modifications will provide further advantages.

The various embodiments of the disclosure, presented with respect to an exemplary embodiment shown in FIG. 13 comprise a first embodiment of the disclosure pertains to an engine exhaust gas treatment article comprising a honeycomb body 300 comprising a longitudinal axis "A," a maximum axial length (L2), a minimum axial length (L1), a plurality of channel walls (as shown in FIG. 1) extending from an inlet end face 314 to an outlet end face 316 defining cell channels therebetween, and a radial area (Ra) perpendicular (shown in FIGS. 3-5) to the longitudinal axis "A," and an outer periphery extending from the inlet end face 314 to the outlet end face 316, wherein at least one of the inlet end face 314 and the outlet end face 316 of the honeycomb body 300 includes a contour surface that provides a uniform exhaust gas residence time across the radial area of the honeycomb body perpendicular to the longitudinal axis "A" that yields a reduction of at least 20% in the ratio of maximum residence to minimum residence of substrate that has flat surfaces on both ends when exhaust gas is flowed through the honeycomb body 300.

In a second embodiment, the engine exhaust gas treatment article of the first embodiment is such that the contour surface that provides a uniform exhaust gas residence time across the radial area of the honeycomb body that yields a reduction of at least 30% in the ratio of maximum residence to minimum residence of substrate that has flat surfaces on both ends when exhaust gas is flowed through the honeycomb body. In a third embodiment, the engine exhaust gas treatment article of the first embodiment is such that contour surface that provides a uniform exhaust gas residence time across the radial area of the honeycomb body that yields a reduction of at least 40% in the ratio of maximum residence to minimum residence of substrate that has flat surfaces on both ends when exhaust gas is flowed through the honeycomb body.

In a fourth embodiment engine exhaust gas treatment article of the first through third embodiments is such that only the outlet end face includes a contour surface that provides a uniform exhaust gas residence time across the inlet end face. In a fifth embodiment, the engine exhaust gas treatment article of the first through fourth embodiments is such that the outlet end face contour surface is asymmetric with respect to the longitudinal axis of the honeycomb body.

In a sixth embodiment, the engine exhaust gas treatment article of the first through fifth embodiments is such that the article further comprises a second honeycomb body 301 in fluid communication with the honeycomb body 300. In a seventh embodiment, the engine exhaust gas treatment article of the second through sixth embodiments is such that the contour surface provides the minimum axial length L1 that is in a range of from about 5% to about 50% of the axial length of the honeycomb body. In an eighth embodiment, the engine exhaust gas treatment article of the second through seventh embodiments is such that the contour surface provides the minimum axial length L1 of the honeycomb body at a first location P1 that is shorter than the maximum axial length L2 of the honeycomb body at a second location P2, wherein a flow rate of the exhaust gas is higher at the first location P1 than the second location P2 when exhaust gas is flowed through the honeycomb body.

In a ninth embodiment, the engine exhaust gas treatment article of the eighth embodiment is such that the first location P1 is closer to the outer periphery of the honeycomb body than the second location P2. In a tenth embodiment, the eighth or ninth embodiment of the engine exhaust gas treatment article of is such that the honeycomb body further comprises an intermediate length L3 at a third location P3 between the first location P1 and the second location P2. In an eleventh embodiment, the engine exhaust gas treatment article of embodiments eight through ten are such that the contour surface includes protrusions in a central region of the outlet end face and recesses in peripheral zones located closer to the outer periphery of the honeycomb body than the central region.

In a twelfth embodiment, the engine exhaust gas treatment article of any of the second through eleventh embodiments further comprises a sensor located in a void formed by the contour asymmetric with respect to any axis, and between the honeycomb body and the second honeycomb body. In a thirteenth embodiment, any of the second through twelfth embodiments of the engine exhaust gas treatment article are such that the honeycomb body is mounted in a housing 320 and further comprises an inlet conduit 324 in fluid communication with the inlet end face 314 of the honeycomb body and an outlet conduit 326 in fluid communication with the outlet end face 316 of the honeycomb body, wherein the housing is in a form of a can surrounding the outer periphery of the honeycomb body. In a fourteenth embodiment, the inlet conduit 324 comprises a u-shaped bend 327 or a ninety-degree bend and the outlet conduit 326 is offset with respect to the longitudinal axis "A" of the honeycomb body 300. In a fifteenth embodiment, the engine exhaust gas treatment article of embodiment thirteen is such that housing is in a form of a cylindrical can and the inlet end face of the honeycomb body does not include a contour and defines a face at least substantially perpendicular to the longitudinal axis.

In a sixteenth embodiment, any of the first through fifteenth embodiments, the honeycomb body has a porosity in a range of greater than 20% and less than 40%. In a seventeenth embodiment, any of the first through sixteenth embodiments is such that the honeycomb body has a porosity in a range of greater than 40% and less than 75%.

An eighteenth embodiment pertains to a method of manufacturing an engine exhaust gas treatment article, the method comprising: shaping a honeycomb body comprising a plurality of channels having an inlet end and an outlet end, each channel having a length and a hydraulic diameter and configured to receive a portion of the engine exhaust at an exhaust viscosity and an average exhaust velocity; determining a local channel exhaust gas velocity in the channel for at least a subset of said plurality of channels, the local channel exhaust gas velocity based on the length of the channel, the hydraulic diameter of the channel, the exhaust viscosity and an exhaust gas pressure drop across the length of the channel; determining a proportionality constant to account for a change in the local channel exhaust gas velocity in the channel based on a change in the channel length and to yield a new local channel exhaust gas velocity; and selecting a new channel length based on a deviation between the new local channel exhaust gas velocity and the average exhaust velocity so as to provide a more-uniform residence time of the engine exhaust in the channel, based on the residence time of the engine exhaust in other channels in the honeycomb body.

In a nineteenth embodiment, the method of the eighteenth embodiment further comprises shaping at least one of the inlet end or the outlet end to provide the selected new channel length. In a twentieth embodiment, the method of the nineteenth embodiment is such that the shaping provides an end face having a contour surface that is asymmetric with respect to the longitudinal axis. In a twenty-first embodiment, the nineteenth and twentieth embodiments are such that the shaping is performed on the honeycomb body prior to firing of the honeycomb body. In a twenty-second embodiment, the nineteenth and twentieth embodiments are such that the shaping is performed on the honeycomb body after firing of the honeycomb body. In a twenty-third embodiment, any of the nineteenth through twenty-second embodiments further comprises applying a catalytic coating to the honeycomb body and the shaping is performing after applying the catalytic coating.

A twenty fourth embodiment pertains to a method of manufacturing an engine exhaust gas treatment article, the method comprising shaping a honeycomb body a honeycomb body comprising a longitudinal axis, a maximum axial length, a minimum axial length, a plurality of channel walls extending from an inlet end face to an outlet end face defining cell channels therebetween, and a radial area perpendicular to the longitudinal axis, and an outer periphery extending from the inlet end face to the outlet end face, wherein at least one of the inlet end face and the outlet end face of the honeycomb body includes a contour surface that provides a uniform exhaust gas residence time across the radial area of the honeycomb body that yields a reduction of at least 20% in the ratio of maximum residence to minimum residence of substrate that has flat surfaces on both ends when exhaust gas is flowed through the honeycomb body.

In a twenty-fifth embodiment, the twenty-fourth embodiment is such that only the outlet end face includes a contour surface that provides a uniform exhaust gas residence time across the inlet end face. In a twenty sixth embodiment, the twenty-fifth embodiment is such that the outlet end face contour is asymmetric with respect to the longitudinal axis of the honeycomb body. In a twenty-seventh embodiment, the twenty-fifth embodiment is such that the contour surface provides the minimum axial length that is in a range of from about 5% to about 50% of the axial length of the honeycomb body. In a twenty-eighth embodiment, the contour surface provides the minimum axial length of the honeycomb body at a first location that is shorter than the maximum axial length of the honeycomb body at a second location, wherein a flow rate of the exhaust gas is higher at the first location than the second location when exhaust gas is flowed through the honeycomb body. In a twenty-ninth embodiment, the first location is closer to the outer periphery of the honeycomb body than the second location. In a thirtieth embodiment, the honeycomb body further comprises an intermediate length at a third location between the first location and the second location.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein provided a description with reference to particular embodiments, it is to be understood that these embodiments are merely illustrative of the principles and applications of the disclosure. It will be apparent to those skilled in the art that various modifications and variations can be made to the present disclosure without departing from the spirit and scope thereof. Thus, it is intended that the present disclosure include modifications and variations that are within the scope of the appended claims and their equivalents.

What is claimed is:

1. An engine exhaust gas treatment article comprising:
a honeycomb body mounted in a housing and comprising a longitudinal axis, a maximum axial length, a minimum axial length, a plurality of channel walls extending from an inlet end face to an outlet end face defining cell channels therebetween, and a radial area perpendicular to the longitudinal axis, and an outer periphery extending from the inlet end face to the outlet end face, the housing in a form of a can surrounding the outer periphery of the honeycomb body; and
an inlet conduit in fluid communication with the inlet end face of the honeycomb body, the inlet conduit comprising a sharp bend that causes a non-uniform exhaust gas flow across the radial area of the honeycomb body and an outlet conduit in fluid communication with the outlet end face of the honeycomb body, wherein the outlet end face of the honeycomb body includes a contour surface that provides a uniform exhaust gas residence time across the radial area of the honeycomb body perpendicular to the longitudinal axis that yields a reduction of at least 20% in a ratio of maximum residence time to minimum residence time of compared to a baseline honeycomb body that has a flat surface on both an inlet end and on an outlet end when exhaust gas is flowed through the honeycomb body.

2. The engine exhaust gas treatment article of claim 1, wherein contour surface that provides a uniform exhaust gas residence time across the radial area of the honeycomb body that yields a reduction of at least 30% in the ratio of maximum residence time to minimum residence time compared with the baseline honeycomb body that has a flat surface on both the inlet end and on the outlet end when exhaust gas is flowed through the honeycomb body.

3. The engine exhaust gas treatment article of claim 1, wherein contour surface that provides a uniform exhaust gas residence time across the radial area of the honeycomb body yields a reduction of at least 40% in the ratio of maximum residence time to minimum residence time compared to the baseline honeycomb body that has flat surfaces on both ends when exhaust gas is flowed through the honeycomb body.

4. The engine exhaust gas treatment article of claim 3, further comprising a second honeycomb body in fluid communication with the honeycomb body.

5. The engine exhaust gas treatment article of claim 4, further comprising a sensor located in a void formed by the contour asymmetric with respect to any axis, and between the honeycomb body and the second honeycomb body.

6. The engine exhaust gas treatment article of claim 1, wherein the outlet end face contour surface is asymmetric with respect to the longitudinal axis of the honeycomb body.

7. The engine exhaust gas treatment article of claim 2, wherein the contour surface provides the minimum axial length that is in a range of from about 5% to about 50% of the maximum axial length of the honeycomb body.

8. The engine exhaust gas treatment article of claim 2, wherein the contour surface provides the minimum axial length of the honeycomb body at a first location that is shorter than the maximum axial length of the honeycomb body at a second location, wherein a flow rate of the exhaust gas is higher at the first location than the second location when exhaust gas is flowed through the honeycomb body.

9. The engine exhaust gas treatment article of claim 8, wherein the first location is closer to the outer periphery of the honeycomb body than the second location.

10. The engine exhaust gas treatment article of claim 8, wherein the honeycomb body further comprises an intermediate length at a third location between the first location and the second location.

11. The engine exhaust gas treatment article of claim 10, wherein the contour surface includes protrusions in a central region of the outlet end face and recesses in peripheral zones located closer to the outer periphery of the honeycomb body than the central region.

12. The exhaust gas treatment article of claim 1, wherein the inlet conduit comprises a u-shaped bend or a ninety-degree bend and the outlet conduit is offset with respect to the longitudinal axis of the honeycomb body.

13. The engine exhaust gas treatment article of claim 1, wherein the housing is in a form of a cylindrical can and the inlet end face of the honeycomb body does not include a contour and defines a face at least substantially perpendicular to the longitudinal axis.

14. The engine exhaust gas treatment article of claim 1, wherein the honeycomb body has a porosity in a range of greater than 20% and less than 40%.

15. The engine exhaust gas treatment article of claim 1, wherein the honeycomb body has a porosity in a range of greater than 40% and less than 75%.

16. A method of manufacturing an engine exhaust gas treatment article, the method comprising:
    shaping a honeycomb body comprising a longitudinal axis, a maximum axial length, a minimum axial length, an outer periphery, a radial area and a plurality of channels having an inlet end and an outlet end, each channel having a length and a hydraulic diameter and configured to receive a portion of the engine exhaust at an exhaust viscosity and an average exhaust velocity;
    determining a local channel exhaust gas velocity in the channel for at least a subset of said plurality of channels, the local channel exhaust gas velocity based on the length of the channel, the hydraulic diameter of the channel, the exhaust viscosity and an exhaust gas pressure drop across the length of the channel;
    determining a proportionality constant to account for a change in the local channel exhaust gas velocity in the channel based on a change in the channel length and to yield a new local channel exhaust gas velocity;
    selecting a new channel length based on a deviation between the new local channel exhaust gas velocity and the average exhaust velocity so as to provide a more uniform residence time of the engine exhaust in the channel, based on the residence time of the engine exhaust in other channels in the honeycomb body;
    shaping the outlet end to provide the selected new channel length; and
    mounting the honeycomb body in a housing in a form of a can surrounding the outer periphery of the honeycomb body and upstream from an inlet conduit in fluid communication with the inlet end face of the honeycomb body, the inlet conduit comprising a sharp bend that causes a non-uniform exhaust gas flow across the radial area of the honeycomb body and an outlet conduit in fluid communication with the outlet end face of the honeycomb body.

17. A method of manufacturing an engine exhaust gas treatment article, the method comprising:
    shaping a honeycomb body a honeycomb body comprising a longitudinal axis, a maximum axial length, a minimum axial length, a plurality of channel walls extending from an inlet end face to an outlet end face defining cell channels therebetween, an outer periphery, and a radial area perpendicular to the longitudinal axis, and an outer periphery extending from the inlet end face to the outlet end face; and
    mounting the honeycomb body in a housing in a form of a can surrounding the outer periphery of the honeycomb body and upstream from an inlet conduit in fluid communication with the inlet end face of the honeycomb body, the inlet conduit comprising a sharp bend that causes a non-uniform exhaust gas flow across the radial area of the honeycomb body and an outlet conduit in fluid communication with the outlet end face of the honeycomb body, wherein the outlet end face of the honeycomb body includes a contour surface that provides a uniform exhaust gas residence time across the radial area of the honeycomb body that yields a reduction of at least 20% in a ratio of maximum residence time to minimum residence time compared to a baseline honeycomb body that has a flat surface on both an inlet end and on an outlet end when exhaust gas is flowed through the honeycomb body.

18. The method of claim 17, wherein only the outlet end face includes a contour surface that provides a uniform exhaust gas residence time across the inlet end face.

* * * * *